United States Patent [19]

Kawashima

[11] Patent Number: 4,571,768
[45] Date of Patent: Feb. 25, 1986

[54] TOOTHBRUSH

[75] Inventor: Yonesaburo Kawashima, Tochigi, Japan

[73] Assignee: Tochigi Seiko Co., Ltd., Tochigi, Japan

[21] Appl. No.: 640,688

[22] Filed: Aug. 14, 1984

[30] Foreign Application Priority Data

Aug. 19, 1983 [JP] Japan .......................... 58-127310[U]

[51] Int. Cl.⁴ .............................................. A46B 9/04
[52] U.S. Cl. ............................... 15/167 R; 15/159 A;
15/110; 128/1.3; 128/62 A
[58] Field of Search ............ 15/167 R, 167 A, 159 R,
15/159 A, 110; 128/1.3, 1.4, 62 A

[56] References Cited

U.S. PATENT DOCUMENTS 1,924,152 8/1933 Coney et al. ..................... 128/62 A
2,042,239 5/1936 Planding ........................... 128/62 X
2,981,264 4/1961 Felice ............................. 128/62 A X
3,258,805 7/1966 Rossnan ........................... 128/62 A
4,484,895 11/1984 Smiley et al. ....................... 128/1.3

FOREIGN PATENT DOCUMENTS 2022360 11/1971 Fed. Rep. of Germany ....... 128/1.3
519039  3/1955 Italy ................................. 15/159 A
5109 of 1882 United Kingdom ................ 128/1.3

Primary Examiner—Peter Feldman
Attorney, Agent, or Firm—Wolf, Greenfield & Sacks

[57] ABSTRACT

A toothbrush having a plurality of bristles supported on a bristle supporting portion of the toothbrush, wherein at least one resilient projecting element encapsulating a permanent magnet in the tip end portion thereof is supported on the bristle supporting portion. The height of the projecting element is somewhat lower than that of the bristles.

2 Claims, 4 Drawing Figures

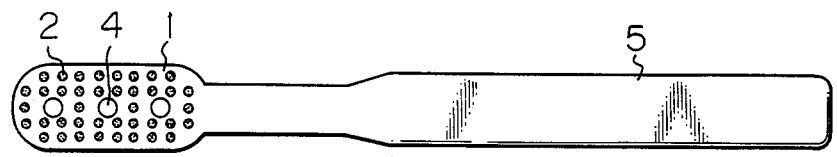
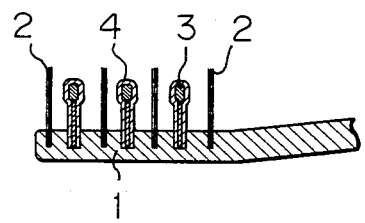
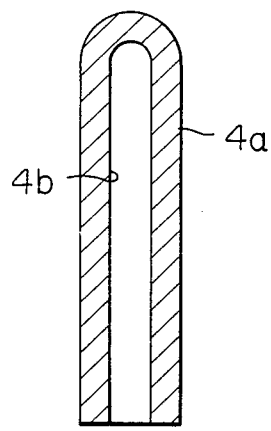 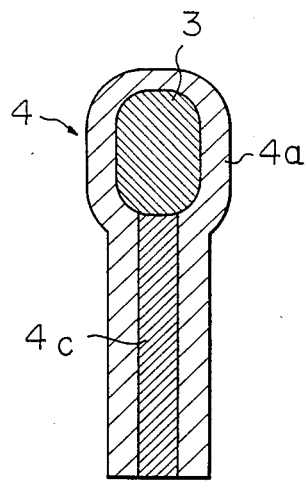

TOOTHBRUSH

BACKGROUND OF THE INVENTION

This invention relates to a toothbrush and, particularly, to a toothbrush having a gum massaging function.

Conventional toothbrush aims mainly to clean teeth by removing dregs of foods remaining between the teeth. There has been proposed to stiffen bristles of a toothbrush so that the gum can be massaged in operating the toothbrush. However, such toothbrush tends to stipulate the gum too hard and has not been favored by the user.

SUMMARY OF THE INVENTION

This invention aims to provide a toothbrush having a gum massaging function with a comfortable feeling and, according to the invention, there is provided a toothbrush comprising at least one resilient projecting element supported on a bristle supporting portion of the toothbrush with the height thereof being somewhat lower than the bristles and a permanent magnet encapsulated in the tip end portion of the projecting element.

Preferably the magnetic flux density of the permanent magnet is about 2000 Gauss.

According to the invention, the gum can be massaged in operating the toothbrush whereby it is possible to prevent and remedy gingivitis, alveslar absess, pyorrhoea alveslaris or the like.

BRIEF DESCRIPTION OF THE DRAWINGS

Further objects and advantages of the invention will become apparent from the following detailed decription taken with reference to accompanying drawings exemplifying a preferred embodiment of the invention, in which;

FIG. 1 is a plan view of a toothbrush according to the invention;

FIG. 2 is a partial longitudinal sectional view of the toothbrush of FIG. 1;

FIG. 3 is an enlarged longitudinal sectional view of one of projecting elements of FIG. 1 with a permanent magnet not being filled therein, and FIG. 4 is a longitudinal sectional view of the projecting element of FIG. 3 with a permanent magnet being filled.

PREFERRED EMBODIMENT OF THE INVENTION

The toothbrush shown in FIG. 1 comprises a bristle supporting portion 1 supporting thereon a plurality of bristles 2 formed of synthetic resin such as nylon or fur and the like, and a handle portion 5. According to the invention, there are supported on the bristle supporting portion 1 and in the central row of the bristles 2 three projecting elements 4 formed of synthetic resin. Each projecting element 4 encapsulates in the tip end portion thereof a permanent magnet 3. The height of the projecting elements 4 is lower than that of bristles 2 by about 3 mm. In the embodiment, each projecting element 4 consists of a hollow silicon rubber tube 4a having one closed end with the hardness being about 60 degrees, and a permanent magnet 3 having the magnetic flux density of about 2000 Gauss and being inserted into hollow portion 4b of the silicon rubber tube (since the diameter of the permanent magnet 3 is slightly larger than the inner diameter of the hollow portion 4a, the diameter of the tip end portion of the projecting element 4 is bulged by the insertion as shown in FIGS. 2 and 4). A thin synthetic resin piece 4c is thereafter inserted into the hollow portion 4b. The synthetic resin piece 4c has preferably the hardness higher than that of the silicon rubber tube 4a by 10~20 degrees so as to improve the strength and the resiliency against the bending. The base portions of the projecting elements are inserted into the bristle supporting portion of the toothbrush by about 2 mm and are fixed according to conventional practice. The material of the projecting elements 4 is not limited to silicon rubber and, other synthetic resins or rubber may also be utilized.

In using the toothbrush having the construction as described heretofore, the bristles 2 function similarly to the bristles of prior art toothbrush in cleaning teeth of the user. When an additional force is applied on the handle portion 5, the projecting elements 4 resiliently abut with the gum of the user, and the gum is stimulated suitably due to the rubbing force of the projecting elements 4 and to the magnetic force of the magnets 3 encapusulated in the projecting elements 4, whereby the circulation of the blood within the gum is improved, the formation of the horny substance at the skin of the gum is accelerated, and the resisting force of the gum is improved. Thus, it is possible to prevent and remedy gingivitis, alveslar abscess, pyorrhoea alveolaris or the like.

When the magnetic flux density of the permanent magnet is low, the aforesaid function cannot be obtained, thus, the magnetic flux density of the magnet 3 is required to be at least 1500 Gauss and, preferably, about 2000 Gauss. The polarity of the permanent magnet 3 is preferably in the vertical direction.

Although the toothbrush shown in the drawings has three longitudinally aligned projecting elements 4, but, the number and arrangement of the projecting elements may be determined as desired.

What is claimed is:

1. In a toothbrush having a plurality of bristles supported on a bristle supporting portion of the toothbrush, at least one resilient projecting element being supported on the bristle supporting portion with the height thereof being somewhat lower than that of the bristles, a permanent magnet being encapsulated in the tip end portion of the projecting element, said projecting element comprising a hollow synthetic resin tube supporting the permanent magnet at the tip thereof, and an elongated synthetic resin piece having a hardness greater than the hardness of the synthetic resin tube and disposed inside the tube at the base thereof.

2. A toothbrush according to claim 1 wherein the magnetic flux density of the permanent magnet is about 2000 Gauss.

* * * * *